United States Patent [19]

Vente et al.

[11] 4,279,856
[45] Jul. 21, 1981

[54] METHOD AND AN APPARATUS FOR ASSEMBLING AND REMOVING A SEGMENTED TIRE MOLD CORE IN A TIRE MOLD

[75] Inventors: Paul Vente, Leverkusen; Dieter Seidenschnur, Neunkirchen-Seelscheid; Ulrich Knipp, Bergisch-Gladbach; Anton Spenner, Leverkusen, all of Fed. Rep. of Germany

[73] Assignee: Bayer Aktiengesellschaft, Leverkusen, Fed. Rep. of Germany

[21] Appl. No.: 110,043

[22] Filed: Jan. 7, 1980

[30] Foreign Application Priority Data

Jan. 9, 1979 [DE] Fed. Rep. of Germany ....... 2900565

[51] Int. Cl.³ .................. B29F 1/00; B29C 5/00; B29H 17/00
[52] U.S. Cl. ................... 264/313; 425/577; 425/54
[58] Field of Search ............ 425/45, 57, 56, 577, 425/542, 38; 264/313

[56] References Cited

U.S. PATENT DOCUMENTS

| | | | |
|---|---|---|---|
| 3,459,849 | 8/1969 | DeRonde | 425/45 X |
| 3,994,650 | 11/1976 | Nishimura et al. | 425/577 |
| 4,106,888 | 8/1978 | Calori | 425/577 |
| 4,160,007 | 7/1979 | Pizzorno | 425/56 X |

FOREIGN PATENT DOCUMENTS

1034336 6/1966 United Kingdom ............ 425/38

*Primary Examiner*—J. Howard Flint, Jr.
*Attorney, Agent, or Firm*—Gene Harsh; Joseph C. Gil; Lyndanne M. Whalen

[57] ABSTRACT

The invention is related to a method of assembling a segmented tire mold core from core segments inside a tire mold, a method of splitting up and removing a segmented tire mold core from a tire mold and an apparatus comprising a tool which determines the outer contour of a tire and a segmented tire mold core which determines the internal contour of a tire, as well as the associated charging, conveying and control devices.

4 Claims, 18 Drawing Figures

METHOD AND AN APPARATUS FOR ASSEMBLING AND REMOVING A SEGMENTED TIRE MOLD CORE IN A TIRE MOLD

BACKGROUND OF THE INVENTION

The invention relates to a method of assembling a tire mold core from separable core segments inside a tire mold, a method of splitting up and removing a segmented tire mold core from a tire mold and an apparatus comprising a tool by means of which the outer contour of a tire is determined and a segmented tire mold core by means of which the internal contour of a tire is determined, as well as the associated charging, conveying and control devices.

It is known to use multiple-part expandable tire mold cores for the production of tires. The difference between the expanded and unexpanded conditions of such cores is not very great. Using known apparatuses, it is possible to produce tires of only small cross sections with small cambered heights. Most conventional commerical tires with larger cushion heights cannot be produced using these known apparatuses. The occurrence of flags of material which make it difficult to remove the core and necessitate frequent cleaning of the tool are further critical factors with these apparatuses. With known core structures, it is difficult to prevent material from penetrating into the openings for the coupling pins and movement bolts or between the wedge faces, thus impairing the movability of the core.

DESCRIPTION OF THE INVENTION

The invention is directed to a method of assembling a tire mold core comprising:

(a) moving simultaneously approximately perpendicularly into and toward the center of the approximate tire plane containing the radii of the tire to be formed, a first unexpanded core segment group;

(b) radially expanding the first core segment group within the tire plane;

(c) arresting the expansion of the first core segment group by stopping the radial movement of the respective core segments of the group when the core segments are positioned so as to partially form a tire mold core; and (d) repeating steps (a), (b) and (c) for each remaining unexpanded core segment group until the tire mold core is complete.

The invention is also directed to a method of removing a segmented tire mold core from a tire mold comprising:

(a) moving respective core segments of a first core segment group of the tire mold core radially toward the center of the approximate tire plane containing the radii of the tire;

(b) arresting the movement of the core segments of the first core segment group when the core segment group is in an unexpanded condition in the center of the tire plane;

(c) moving the core segments of the first core segment group simultaneously approximately perpendicularly to and outside of the tire plane; and (d) sequentially repeating steps (a), (b) and (c) for each remaining expanded core segment group until all core segment groups have been removed from the tire plane.

Additionally, the invention is directed to a method of making tires by introducing a segmented tire mold core into a tire mold, forming a cavity of predetermined thickness around the completed tire mold core by means of a multiple part tire tool which determines the outer contour of the tire to be formed, charging the cavity with a tire forming material, opening the tire tool after the tire has been formed, removing the tire from the tire mold and removing from the tire mold the segmented tire mold core.

The invention is also directed to an apparatus for making a tire comprising a tool by means of which the outer contour of the tire is determined and a tire core by means of which the inner contour of the tire is determined, as well as the associated charging, conveying and control devices, characterized in that the core (1 or 35) comprises segments, the segments (1 or 35) are joined toward the center of the tire with a guide and an adaptor member (21 or 36), said segments (1 or 35) being radially movable in groups approximately in the plane of the tire and said segments also being movable approximately perpendicularly to the plane of the tire in a position at the center of the tire.

Objects of the invention are generally to produce high quality tires economically and particularly to reduce the cycle times by automating the introduction of a core into the tire tool and removing the core in the tire tool in a practical manner. High demands are placed on the apparatus' non-susceptibility to failure.

These objects are achieved by the apparatus in that the core comprises separable core segments, each of the core segments is joined toward the center of the tire with a guide and adaptor member; the core segments can be moved radially in core segment groups approximately in the tire plane and also can be moved approximately perpendicularly to the tire plane while in a position in the center of the tire. When assembling the tire mold core, the core segments are introduced in unexpanded core segment groups into the center of the approximate tire plane containing the radii of the tire to be formed, are expanded radially in core segment groups, and are arrested in their terminal positions forming the mold core. When splitting up the mold core, the core segments are moved in core segment groups toward the center of the tire, and then are moved in these core segment groups approximately perpendicular to the tire plane and into a plane outside the approximate plane of the tire.

In particular, high quality tires can be produced by this method from pourable elastomers. The method is so flexible that most commercial tires can be produced having conventional tire widths, tire diameters and cushion heights.

It is also particularly desirable that the filling operation can take place from the center. In the assembled condition, the core does not have any inconvenient structural components toward the center of the tire and has a very smooth internal surface. Whether the tire is formed by injection molding or by centrifuging is of secondary importance in the invention. The method is not only suitable for the production of an integral tire but it is also possible to produce a ready-made or partially-made tire on the stable core and to compress tires which have been made beforehand by, for example, vulcanization. Both pourable and injectable elastomers or vulcanizable elastomers can be processed on the apparatus of the invention.

The tire mold core is very stable in shape and position. It can be mechanically dismantled and assembled in the mold in a short time. Undisturbed operation is guaranteed for long periods due to the simple radial movement of the core segments approximately in the plane of the tire.

The preferably metallic core produces a smooth internal surface. The core segments can be guided and arrested so accurately to form a smooth, circular internal surface that tires which can run concentrically with high accuracy are obtained. Over-dimensioning of the wall thickness for reasons of safety can be omitted due to the high precision possible during production.

There are ventilation slits either unavoidable or intentional on the mold core. If material should penetrate into these slits, the ability to split up the core is not placed in doubt. Production is possible without bladders.

Each of the core segments has a guide and an adaptor member toward the center of the tire. During removal of the core, the core segments first are moved radially toward the center of the tire plane and then guided axially through the internal diameter of the tire and mold and out of the separating plane of the mold. The core segments are usually shifted to the central point of the tire plane with the aid of a lifting element group. All core segment groups can be moved with one lifting element group if it is mounted pivotally. During the lifting stroke, the guide members of the core segments slide from the guides in the outer mold into the guides of a take-up platform which is positioned in the center. The take-up platform and its associated core segment group is lowered axially and then moved, for example, in a linear direction. The next free take-up platform is positioned in the take-up position so that the next core segment group can be removed from the mold. A course of movement of this type which takes place on linear or simple geometric (circular) paths is rarely susceptible to breakdown. In known apparatuses, the three-dimensional course of movement is quite complicated. By the invention, precise positioning of the core segments is possible, even over long operating times, due to the simple and inexpensive guides in conjunction with stops and controlled lifting elements.

Further stabilization and clamping of the core segments is provided by the cut guide between the core separating planes which always are perpendicular to the tire plane. The simple geometric shape of the core segments is desirable for reasons of production.

The core can be heated in the same manner as the mold so that vulcanizable compositions can also be pressed on to the core with close tolerances in the wall thickness and can then be processed.

It may be necessary to evacuate the mold prior to casting. The method of the invention does not give rise to any particular problems at this stage. The channels can run between or within the core segments, for instance by countersinks into the core separating plane.

The core separating plane preferably runs radially or almost radially. These planes are perpendicular to the tire plane. It is advantageous, for example, if the core segments which are removed from the core first and, therefore, reinserted last are designed slightly wedge-shaped toward the external diameter. This makes access easier as the core is split up and allows the core segments to be clamped in the expanded condition.

A group of segments is moved simultaneously in each case in a preferred range of from three to six times for about each two to six parts. This reduces the cycle time considerably.

The invention is illustrated in the drawings by way of example and is described in more detail below.

Figure 1A:
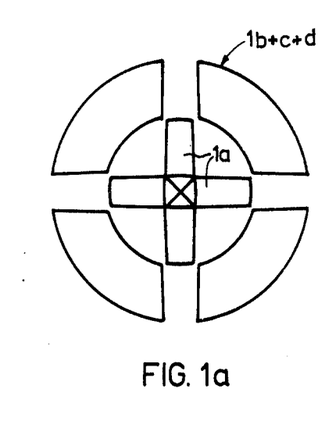
FIGS. 1a–1d show schematically the sequential splitting up and removal of a segmented mold core from a tire plane in four core segment groups of four core segments each.
Figure 1B:
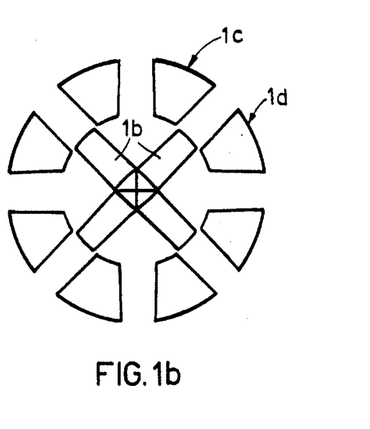
Figure 1C:
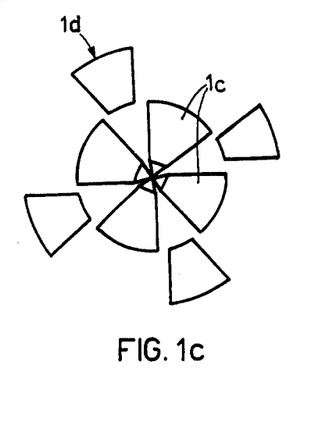
Figure 1D:
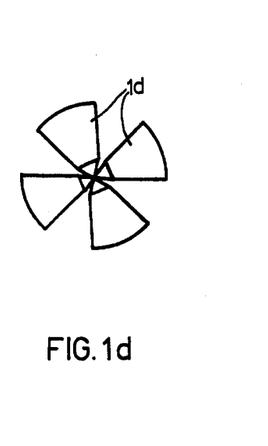

In these examples, the core 1 is divided into 16 segments which are combined into four groups. The allocation of the segments to a group is clarified by the addition of the letters a, b, c and d. In FIG. 1a, the first core segment group 1a is moved from its position in the mold core to the center of the tire leaving groups 1b, 1c and 1d still in the expanded condition. The core segments 1a are then moved radially to the center of the tire and then out of the tire plane. FIG. 1b illustrates a condition in which the second core segment group 1b has been moved from the expanded condition and into the center of the tire. It, too, is then moved out of the tire plane. The core segments (for example, 1a and 1b) are approximately disc-shaped. They are preferably tapered in a slightly wedge shape in the outward direction. In FIG. 1c, only the last core segment group 1d remains in the expanded condition while the group 1c has been moved to the center. In FIG. 1d, core segment group 1d has been moved from the expanded condition into the center of the tire plane, all other groups already having been removed from the tire plane. The last core segment group 1d need no longer be moved from the plane of the tire in FIG. 1d as it can be the fire core segment group to be moved back into the mold core position when the mold core is reassembled.

Figure 2:
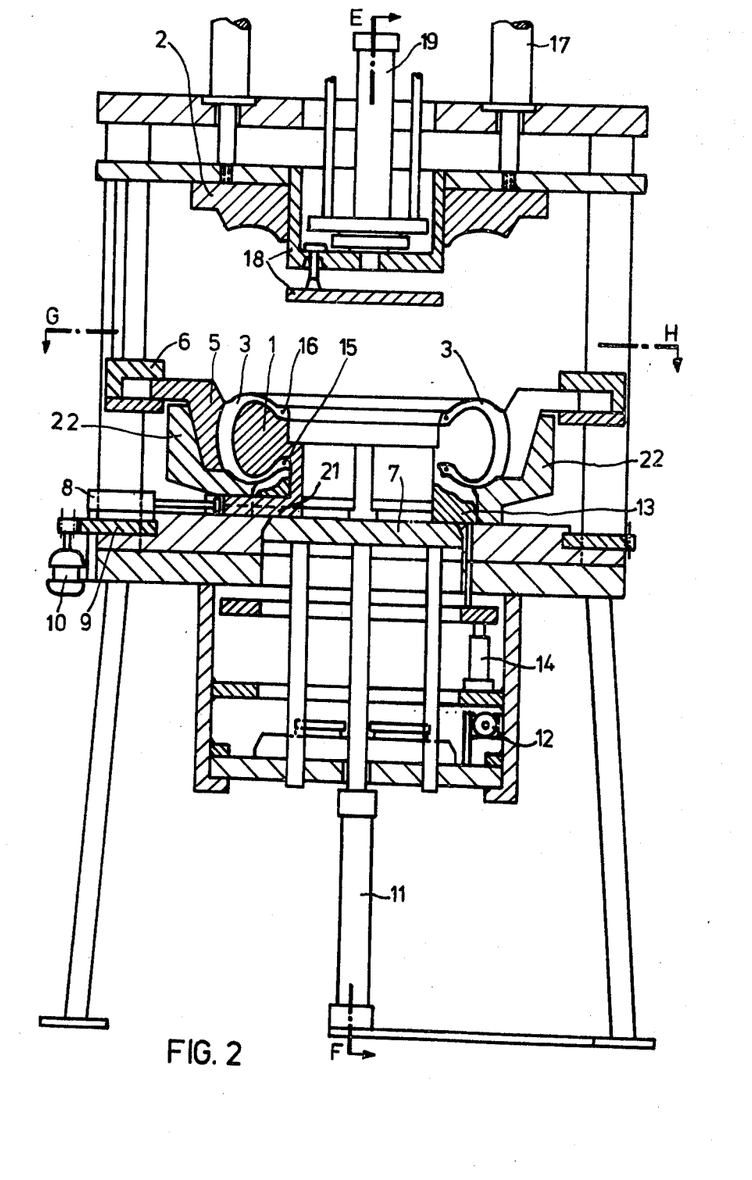
FIG. 2 shows a section through an apparatus.

FIGS. 2 to 8 and 9 to 13 show two different embodiments of the apparatus of the invention. FIG. 2 shows a section through an apparatus from the side with press, tool and core removing unit (FIG. 2 (7). The upper section of the mold 2 is raised. The tire 3 cannot yet be removed in this position. As seen from the lefthand region, at least one core segment group 1 is also present in the tire 3. In addition, the outer mold segments 5 are still engaged. The outer mold segments 5 are drawn outwards by the claws 6 and the tire 3 is released only when the upper section of the mold is raised further.

Figure 3:
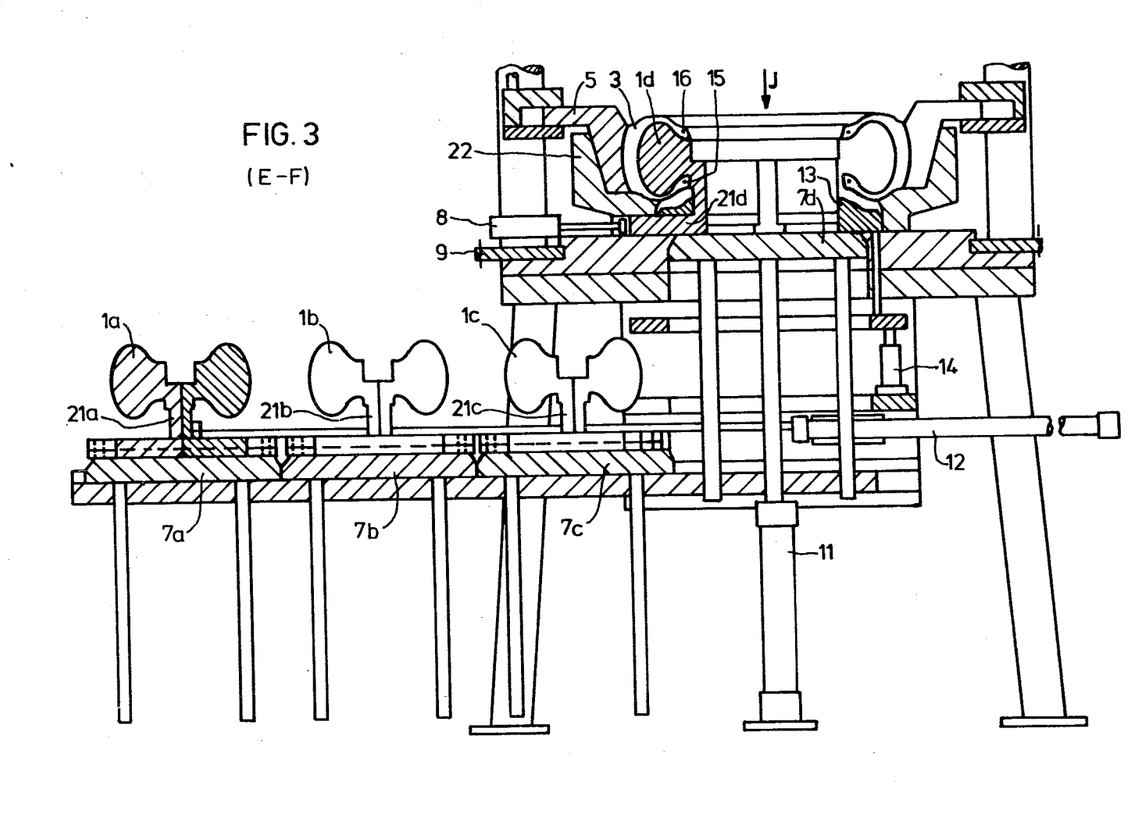
FIG. 3 shows a section (E-F according to FIG. 2) through an apparatus without an upper portion of the tire mold and press.

The assembly and dismantling of the segmented tire core 1 is made clearer in FIG. 3. Each of the core segment groups 1a, 1b, 1c and 1d is deposited on its own lifting platform 7. The segment groups are designated respectively 1a, 1b, 1c and 1d to distinguish which segment group belongs to which lifting platform (7a, 7b, 7c and 7d). In FIG. 3, three core segment groups have already been removed. The lifting platform 7d is raised and the core segments 1d which are still located in the tire 3 can be moved to the center of the tire by the lifting elements 8 (further illustrated in FIG. 4). The lifting elements 8 obviously also move the core segments from the center of the lifting platform into the mold core position in the same way. The four lifting elements 8 (shown in FIG. 4) are located on a rotating table 9 (FIGS. 3 and 4) which is adjusted by a geared motor 10 (FIGS. 2 and 4) so that they can move all core segment groups 1 (FIGS. 3 and 4).

After the mold core has been split up, the core segments can be expanded in the reverse sequence to again form the mold core. As can be seen from FIGS. 3 and 4, the lifting platform 7d with the core segments 1d, which are shown still in the expanded condition, obviously need not be lowered by the lifting device 11 (FIG. 3) when the core segments 7d are moved to the center and the tire is removed. As the core is reassembled, core segments 1d are moved back into the mold core position first, as shown in FIGS. 3 and 4. The empty lifting platform 7d is lowered. The advancing movement of the lifting cylinder 12 (FIGS. 3 and 4) will then move the core segment group 1c on the lifting platform 7c beneath the tire tool. In the meantime, the lifting elements 8 on the rotary platform 9 will also move into the coupling position required for the core segments 1c. The couplings 23 on the core segments 1 are shown more clearly in FIGS. 7 and 8. The lifting elements 8 move the core segments 1c into their expanded position after they have been raised on the lifting platform 7c into the plane of the tire. The remaining core segments 1b and 1a are also inserted in the same way. The mold ring 13 is raised by the raising element 14 (FIGS. 2 and 3). Foot rings are needed in most tires. In the method of the invention, the lower foot ring 15 is inserted when all core segments 1 have moved to the center of the tire plane. The upper foot ring 16 is inserted once the core 1 has expanded before the mold is closed by the press 17 (FIG. 2). As can be seen from FIGS. 2 and 5, as the mold tool is closed, the outer mold segments 5, the upper section 2 of the mold and the mold plate system 18 are moved into the production position. In so doing, the mold plate system 18 takes over the locking of the core segments 1 and seals the mold in the center. The remaining cavity is filled by means of the end unit 19 (FIG. 2) of the dosing device which is usually a mixing head. A tire is then formed which receives its final shape due to both the contour of the tool (2, 5, 13 and 22) and the internal core segments 1 forming the mold core.

Once reaction or vulcanization is complete, the core is split up in the reverse sequence as just described, i.e. the core segment group 1a which was mounted last is drawn on to the lifting platform 7a first. The mold ring 13 has to be lowered before the core is dismantled.

Figure 4:
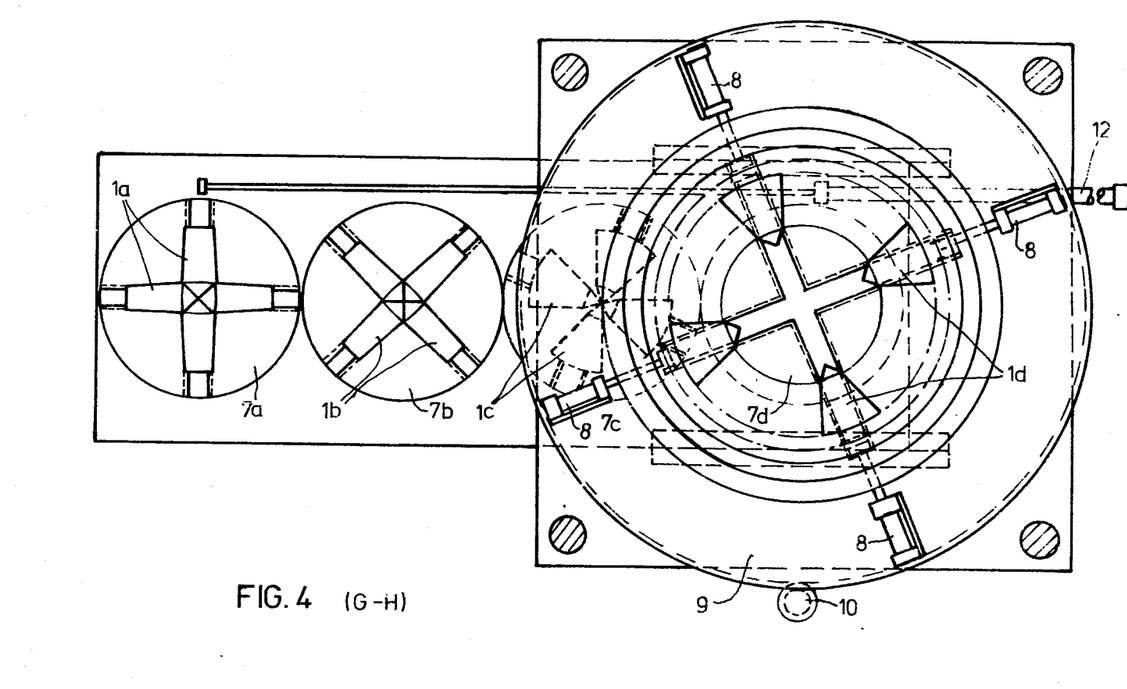
FIG. 4 shows a section (G-H according to FIG. 2) through the same apparatus.

In FIG. 4, core segment groups 1a, 1b and 1c on the lifting plates 7a, 7b and 7c are located in the lowered position to the side of the tire tool. The core segments 1d are moved into the expanded position.

Figure 5:
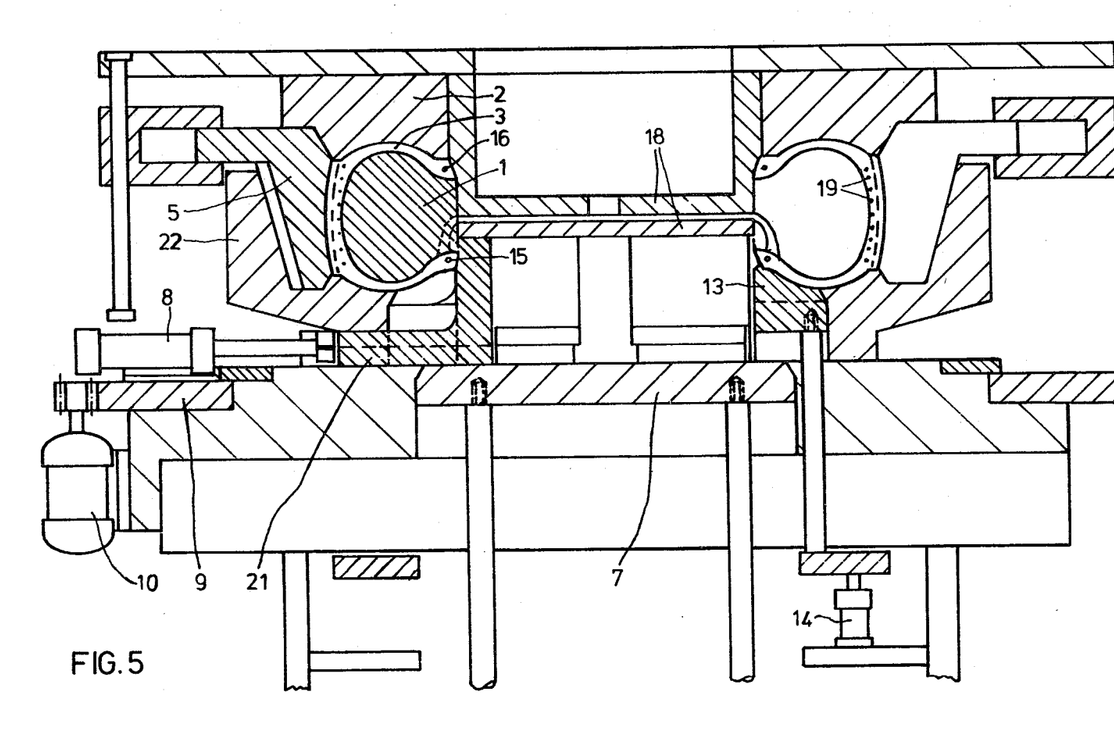
FIG. 5 shows a tire tool (detail from FIG. 2).
Figure 7:
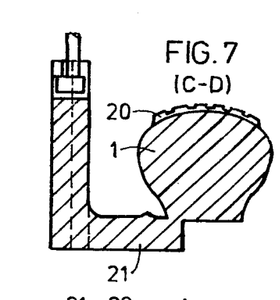
FIG. 7 shows the core segment (section C-D in FIG. 8).
Figure 8:
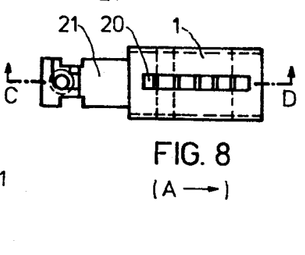
FIG. 8 shows the core segment (view in direction A in FIG. 6).

In FIG. 5, the tire mold is completely compressed. It can be seen that a reinforcement 4 is provided in the running tread of the tire in addition to the foot rings 15 and 16. These reinforcing inlays are placed in the mold at the same time as the lower foot ring 15 when the core has been split up. As illustrated in FIGS. 7 and 8, there are usually holding combs 20 on the core segments.

Figure 6:
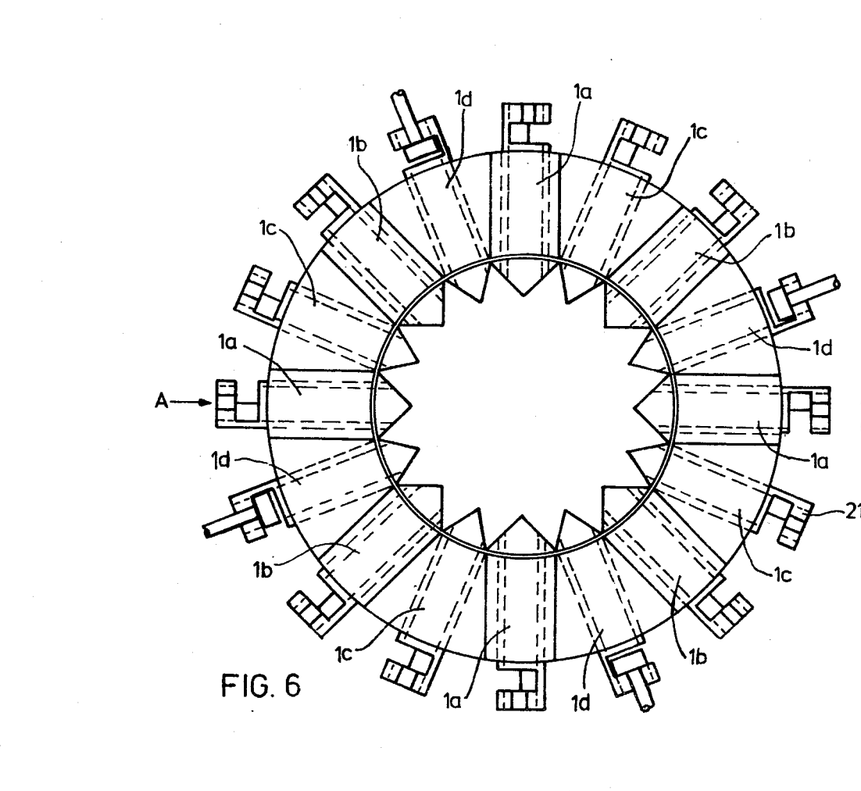
FIG. 6 shows an element for core removal (view of the segments in the direction of the section G-H in FIG. 2) without press and mold.

FIG. 6, which is a view approximately perpendicular to the plane which would contain the radius of the tire, shows the segments in the production condition without press and without mold.

An individual segment of group 1a or 1b with combs 20 is illustrated in FIGS. 7 and 8.

FIGS. 9 to 13 show another embodiment of the apparatus of the invention. Unlike the previous apparatus, in this example the tire axis extends horizontally. This apparatus is preferably used for making up and compressing elastomers. It is also particularly suitable for vulcanizing ready-made rubber tires. The core is readily accessible. It is simple and fast to assemble due to its small number of components. This core removal unit is very suitable for rotational casting. The core unit is suitable for making up tires without an outer mold, for example Numbers 30, 31 and 32 in FIG. 9.

Whereas in the first embodiment the core segments moved in the plane of the tire or parallel to the plane of the tire in the first step of the operation for splitting up the core, in this embodiment the path of the core segments is circular. However, as suggested by FIG. 10, since the radii are relatively large in comparison with the path, the core segments remain approximately in the plane of the tire.

Figure 9:
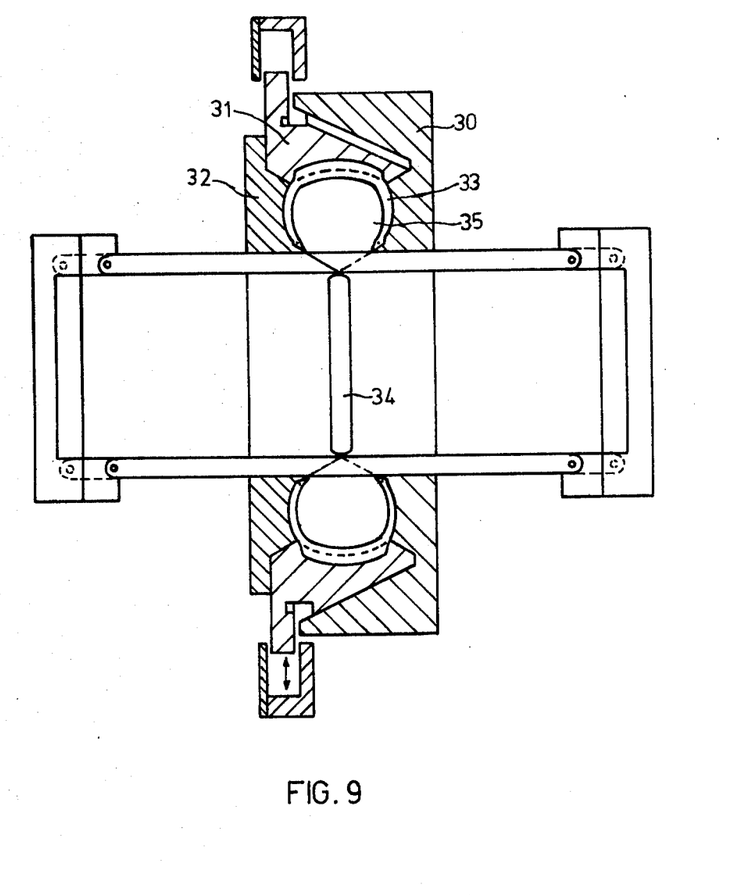
FIG. 9 shows the tire tool in the closed condition.

Whereas the tool parts 2, 5, 13 and 22 shown in FIGS. 2 to 5 correspond to the tool which determines the outer contour of the tire in the first embodiment discussed, parts 30, 31 and 32 shown in FIGS. 9 to 13 determine the outer contour of tire in the second embodiment. FIG. 9 shows the tool in the production position. Once the tire material has fully reacted, the central locking plate 34 will move to the right.

Figure 10:
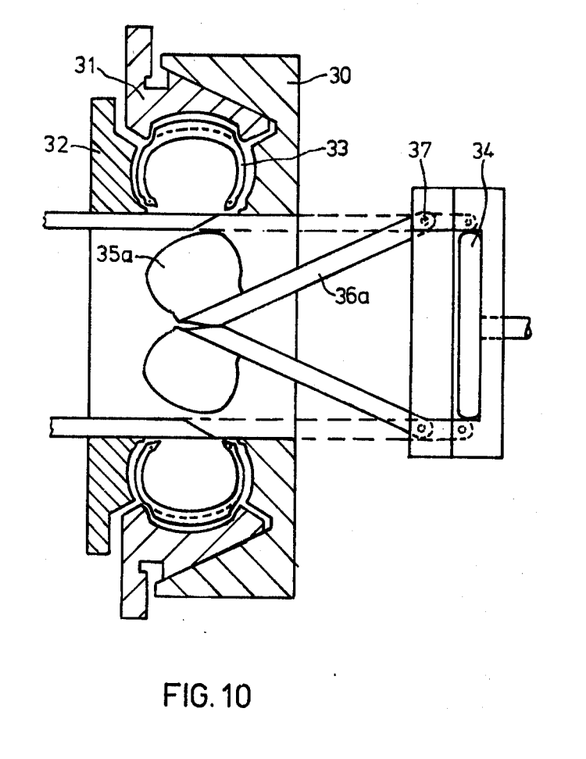
FIG. 10 shows the tire tool in which a core segment group is moved to the center of the tire.
Figure 11:
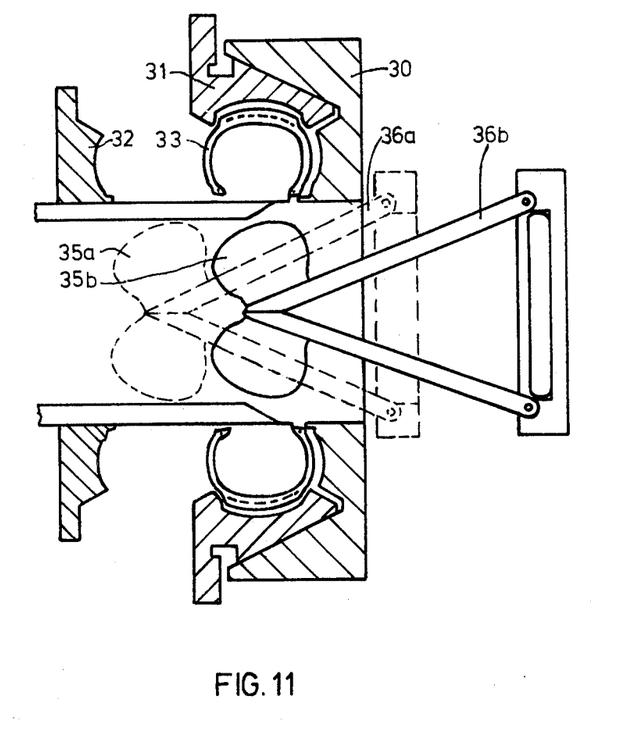
FIG. 11 shows a tire tool in which an additional core segment group is removed.

FIG. 10 shows the first core segment group 35a. The lateral dishes 30 and 32 are open and the moldings 31 are raised in the radial direction. The core segments 35 are joined to hinge arms 36. They can be pivoted about the hinge axis 37 toward the center of the tire mold over a circular path. In FIG. 11, the tool with the outer moldings 30 and 31, including the core segment groups 35b, 35c and 35d which have not yet been moved into the center of the tire plane, will travel by about one tire width to the right. The core segment group 35a which has already been withdrawn remains in its position and is portrayed by broken lines. In this position, the core segment group 35b is dismantled by lifting elements. These lifting elements which are not shown in FIG. 11 are located between the hinge arms 36a of the core segments 35a which have already been removed from the mold.

Figure 12:
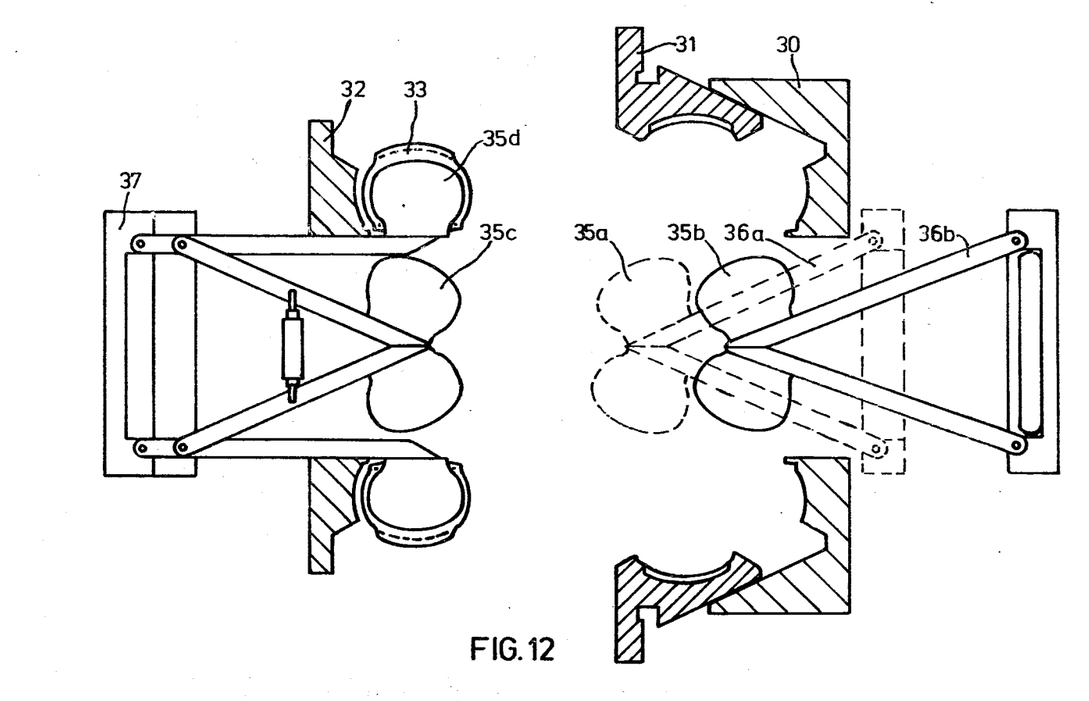
FIG. 12 shows a tire tool in which the third core segment group is removed.

FIG. 12 shows the next step of removal from the mold. The core segment groups 35a and 35b which have been pivoted away by their pivoting the guide bearings and the open segmented outer mold (Numbers 31 and 30) remain in their position while the other external mold dish 32 with the tire 33 and the remaining core segments 35c and 35d travel by about two tire widths to the left from their position in FIG. 11. There, core segment group 35c is removed.

Figure 13:
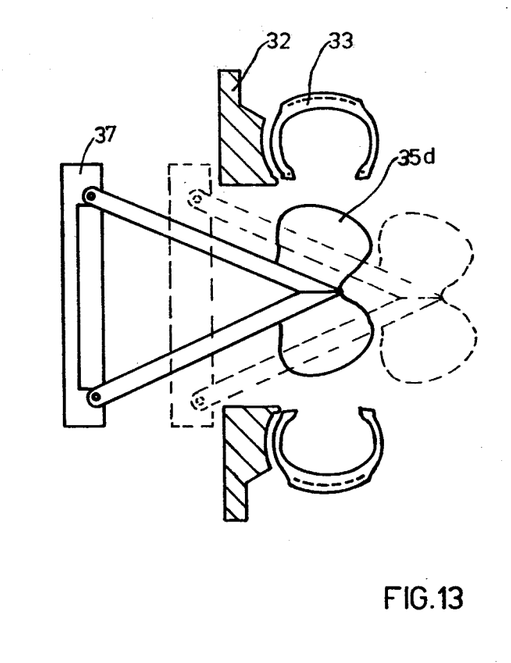
FIG. 13 shows a tire tool which is completely split up.

As the last stage, the outer ring 32 of the mold with the core segment group 35d including mounting 37 is moved once again by about one tire width to the left and the last core segments 35d are pivoted to the central point of the tire. The tire 33 can be removed through the opening formed between the outer moldings which were moved to the right and to the left and the core segment groups. The core is assembled in the reverse order.

If tires are to be made up separately, the outer mold (30, 31 and 32) is replaced by centering rings which, in conjunction with the locking plate 34 of FIG. 9 ensures that the core segments 35 are centered.

What is claimed is:

1. A method of assembling a tire mold core comprising:
    (a) moving simultaneously approximately perpendicularly into and toward the center of the approximate tire plane containing the radii of the tire to be formed, a first unexpanded core segment group;
    (b) radially expanding said first core segment group within the tire plane;
    (c) arresting the expansion of said first core segment group by stopping the radial movement of the respective core segments of said group when the core segments are positioned so as to partially form a tire mold core; and
    (d) repeating steps (a), (b) and (c) for each remaining unexpanded core segment group until the tire mold core is complete.

2. A method of removing from a tire mold a segmented tire mold core comprising:
    (a) moving respective core segments of a first core segment group of the tire mold core radially toward the center of the approximate tire plane containing the radii of the tire;
    (b) arresting the movement of the core segments of said first core segment group when said core segment group is in an unexpanded condition in the center of the tire plane;
    (c) moving the core segments of the said first core segment group simultaneously approximately perpendicularly to and outside of the tire plane; and
    (d) sequentially repeating steps (a), (b) and (c) for each remaining expanded core segment group until all core segment groups have been removed from the tire plane.

3. A method of making a tire comprising:
(1) introducing a segmented tire mold core into a tire mold wherein
    (a) a first unexpanded core segment group is moved simultaneously approximately perpendicularly into and toward the center of the approximate tire plane containing the radii of the tire to be formed,
    (b) said first core segment group is expanded radially within the tire plane,
    (c) the expansion of said first core segment group is arrested by stopping the radial movement of the respective core segments when the core segments are positioned so as to partially form a tire mold core,
    (d) repeating steps 1(a), 1(b) and 1(c) for each remaining unexpanded core segment group until the tire mold core is completed;
(2) forming a cavity of predetermined thickness around said completed tire mold core by means of a multiple part tire tool which determines the outer contour of the tire to be formed;
(3) charging said cavity with a tire forming material;
(4) opening said tire tool after the tire has been formed;
(5) removing the tire from the tire mold; and
(6) removing from the tire mold said segmented tire mold core wherein
    (a) the respective core segments of the core segment group introduced last in forming said tire mold core are moved radially toward the center of the tire plane,
    (b) said radial movement of said last introduced core segment group is arrested when said core segment group is in an unexpanded condition in the center of the tire plane,
    (c) the core segments of said last introduced core segment group are moved simultaneously approximately perpendicularly to and outside of the tire plane, and
    (d) sequentially repeating steps 6(a), 6(b) and 6(c) for each remaining expanded core segment group in the reverse order in which the core segment groups were introduced into the tire mold until all core segment groups have been removed from the tire plane.

4. An apparatus for assembling and/or removing a segmented tire mold core from a tire mold comprising:
(1) core segment groups comprising separable core segments wherein
    (a) said core segments are joined toward the center of the approximate tire plane which contains the radii of a tire to be formed or formed with a guide and an adaptor member,
    (b) said core segments of said core segment groups are radially movable approximately in the tire plane,
    (c) said core segments are movable approximately perpendicularly to the tire plane when said core segment groups are in a position at the approximate center of the tire plane;
(2) a means for moving said core segment groups approximately perpendicularly into or out of the tire plane at a position approximately at the center of the tire plane;
(3) a means for moving the respective core segments of said core segment groups radially inward or outward while in the tire plane.

* * * * *